United States Patent Office 3,580,734
Patented May 25, 1971

3,580,734
ANTISTATIC FILM BASE MATERIAL AND
PROCESS FOR PREPARING SAME
Margaret L. Clachan, Patrick T. McGrail, and Basil R.
Shephard, Brantham, Manningtree, England, assignors
to Bexford Limited, Manningtree, England
No Drawing. Filed Sept. 21, 1967, Ser. No. 669,384
Claims priority, application Great Britain, Sept. 30, 1966,
43,843/66
Int. Cl. B32b 27/06; C09k 3/16
U.S. Cl. 117—138.8                                    6 Claims

ABSTRACT OF THE DISCLOSURE

This application describes a process of rendering film base less prone to pick up static electricity which comprises coating the film base with a layer consisting essentially of a sodium, potassium or lithium salt of a copolymer of an alpha-beta unsaturated dicarboxylic acid or anhydride with an ethylenically unsaturated comonomer.

---

This invention relates to the treatment of films of plastics which may bear coatings on one or both sides, to render them less liable to accumulate static electricity during use, and to the resultant film products which have a low tendency to accumulate static electricity.

It is well known that most films of plastics tend to accumulate static charge in handling operations such as reeling, unreeling, passage over rollers or transport of sheets, in which operations there is rubbing of the film or separation of two surfaces of the film, or of the film surface from another surface.

In most handling operations the presence of static charge is most undesirable and gives rise to hazards of fire, hazard of electric shock, inconvenience of sticking of sheets of film, either together or to other surfaces, accumulation of dust on the film and, in photographic film, undesirable marking of the emulsion by static discharge.

Treatment of one or both surfaces of a film of plastic which may already bear other coatings, with an agent which increases electrical conductivity is the usual method of avoiding static accumulation. For this purpose, many substances have been described including inorganic salts, sulphonic or phosphoric acids, amine and quaternary salts, and other substances or ionic or highly polar character. Many of these substances, although conductive, and hence antistatic per se are defective in practice for reasons such as failure to adhere to the substrate film surface, failure to form a coherent layer, insufficient antistatic effect frequently due to excessive penetration into the substrate, lack of persistance of the antistatic effect after handling or after super-coating of the conducting layer, excessive hygroscopicity, excessive stickiness when the treated film is heated at temperatures up to 100° C. or ineffective antistatic properties at low relative humidities. Furthermore, for photographic purposes, the agents must not affect the sensitometric behaviour of the film.

According to the present invention there is provided a process of rendering film bases, e.g. for photographic purposes, such as silver halide and diazo sensitised films and for drafting purposes, less prone to pick up static electricity, which comprises coating the film base with a layer consisting essentially of a sodium, potassium or lithium salt of a copolymer of an alpha-beta unsaturated dicarboxylic acid or anhydride with an ethylenically unsaturated comonomer.

The dicarboxylic acid or anhydride may be maleic, itaconic, citraconic, dimethyl maleic or similar well-known alpha-beta unsaturated acids and anhydrides known to be copolymerisible with unsaturated comonomers. It is understood that where an anhydride rather than a dicarboxylic acid is used in the copolymerisation, hydrolysis of the anhydride function during partial or complete conversion to sodium potassium or lithium salt results in the same antistatic agent as results from use of the dicarboxylic acid.

The ethylenically unsaturated comonomers may have the general structure:

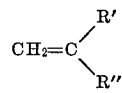

where:

R' and R" are both hydrogen, or
R' is an aryl group or an alkaryl group and R" is hydrogen, or
R' is alkoxyl (—OR) in which the hydrocarbon portion R contains not more than six carbon atoms and R" is hydrogen, or
R' is carbo-alkoxyl (COOR) in which hydrocarbon portion R contains not more than six carbon atoms and R" is hydrogen or methyl, or
R' is carbamide (—CONH$_2$ and R" is hydrogen or methyl, or
R' is a chloride or a cyanide group and R" is hydrogen, or
R' is acyloxy (—OCOR) in which the hydrocarbon portion R contains not more than six carbon atoms, and R" is hydrogen or methyl.

Typical examples of copolymerisable monomers of this general structure are ethylene, styrene, vinyl toluene, methyl vinyl ether, methyl methacrylate, ethyl acrylate, acrylonitrile, acrylamide, vinyl chloride, vinyl acetate, or isopropenyl acetate.

The copolymers applied to render film bases antistatic may contain 50–20 mole percent of dicarboxylic component and of this component 20–100% of the total carboxylic functions may be present as sodium, potassium or lithium salt.

It is preferred that the copolymer be prepared from maleic and styrene monomers and that the product contain 40–50 mole percent of dicarboxylic component and that 40–80% of the total carboxylic functions are in the salt form. The preferred materials give adequate antistatic properties and yet have minimum effect resulting from ion transfer in contact with or after having been coated with substantially neutral photographic emulsions.

Film bases which may be so rendered antistatic include:

(I) Polyethylene terephthalate.

(II) Polyethylene terephthalate plus an adherent polymer layer e.g. a layer consisting essentially of a cellulose ester, a copolyvinyl monochloroacetate-vinyl acetate, a polyvinyl acetal, which layer may contain other constituents including toothing, matting or opaquing agents.

(iii) Polyethylene terephthalate plus an adherent thin layer consisting essentially of gelatin optionally containing minor properties of other polymers such as cellulose acetate or polyvinyl acetate.

(iv) A cellulose ester for example cellulose triacetate, cellulose secondary acetate or cellulose acetate butyrate.

(v) A cellulose ester plus an adherent thin layer consisting essentially of gelatin optionally containing minor proportions of ether polymers such as cellulose acetate.

(vi) Polycarbonate.

(vii) Polycarbonate plus an adherent polymer layer, e.g. a layer consisting essentially of a cellulose ester, partially hydrolysed polyvinyl acetate or polyvinyl acetal.

(viii) Polycarbonate plus an adherent thin layer consisting essentially of gelatin optionally containing minor proportions of ether polymers such as cellulose acetate.

The copolymers as defined may be applied to the film bases in weight per unit area in the range from 0.05 mgm./dm.$^2$, but it is preferred to apply not lesss than 0.1 mgm./dm.$^2$ so that a coherent layer is obtained with a surface resistivity less than $10^{11}$ ohms/sq. at 60% relative humidity and not more than 3 mgm./dm.$^2$ so that undesirable effects due to incomplete mixing with subsequently applied photographic emulsions are avoided.

The copolymers as defined may be applied to the film base from aqueous or aqueous organic solvent mixtures, for example containing methanol, ethanol, acetone and methyl ethyl ketone and containing at least 2% water, by any of the known procedures, e.g. by dip and air knife coating methods. Wetting agents such as Cationic SP (Monsanto Chemical Company Limited) may be added to improve the quality of the coating.

The antistatic layers may also contain supplementary antistatic agents such as lithium nitrate or sodium diethyl phosphate and may include agents such as silica pigments or styrene-maleic anhydride ester copolymers to improve slip characteristics.

The antistatic polymers employed in the present invention may be derived from materials commercially available. Thus ethylene-maleic anhydride copolymers such as DX 840 (Monsanto) or methyl vinyl ether-maleic anhydride copolymers such as Gantrez AN (General Aniline Corp.) may be dissolved in aqueous alkali with heating and the solution subsequently diluted with, e.g. with methanol, ethanol or acetone, to give the required final solution for coating purposes.

Alternatively the copolymers may be readily prepared. For instance styrene and maleic anhydride may be copolymerised in toluene in the presence of a typical free radical generating catalyst such as benzoyl peroxide whereby the copolymer is precipitated and can be removed by filtration, dried and dissolved in aqueous alkali as described. Styrene and maleic anhydride may be similarly copolymerised in acetone whereupon the copolymer remains in solution. When heating with aqueous alkali, the acetone may be removed if necessary by distillation prior to the preparation of the final coating solution.

The surface resistivity of the products bearing a layer of copolymer as defined depends on the proportion of the carboxylic groups of the copolymer in the salt form as shown in Table 1 below. A styrene-maleic acid copolymer containing 50 mole percent maleic acid units was applied to polyethylene terephthalate film base so that there was 1.4 mgm. of copolymer per dm.$^2$ the percentage of carboxylic acid groups in the sodium salt was varied from 0–100% and the surface resistivity measured at 60% RH.

TABLE I

| | Percent carboxylic acid groups as sodium salt | | | | |
|---|---|---|---|---|---|
| | 0 | 25 | 50 | 75 | 100 |
| Surface resistivity in ohms/sq. | $10^{12}$ | $6.0 \times 10^9$ | $2.5 \times 10^8$ | $2.0 \times 10^8$ | $1.5 \times 10^8$ |

The surface resistivity of the product also depends on the weight of copolymer applied per unit area. In Table II below are quoted the surface resistivity results at 60% relative humidity (RH) with different substrates bearing various weights of a styrene-maleic acid copolymer containing 50 mole percent of maleic acid and with 60% of the carboxylic acid groups as the sodium salt.

TABLE II

Surface resistivity at 60% RH in ohms/sq.

| Substrate | Mg of copolymer applied/dm.$^2$ | | | | |
|---|---|---|---|---|---|
| | 0.5 | 1.0 | 1.5 | 2.0 | 3.0 |
| Polyester | $1 \times 10^8$ | $1.8 \times 10^8$ | $1.0 \times 10^8$ | $8.1 \times 10^7$ | $5.2 \times 10^7$ |
| Gelatin | $1 \times 10^{12}$ | $1.5 \times 10^{10}$ | $2.5 \times 10^9$ | $1.0 \times 10^9$ | $2.5 \times 10^8$ |
| Cellulose acetate | $6 \times 10^8$ | | | | |

The copolymers as defined are particularly advantageous as they have good antistatic properties not only at 60% RH but also at lower humidities. In Table III the surface resistivity results are given at different relative humidities of polyethylene terephthalic film coated with 2.1 mg./dm.$^2$ of the sodium salt of a styrene-maleic acid copolymer containing 50 mole percent of maleic acid.

TABLE III

Surface resistivity in ohms/sq. at different humidities

| | Relative humidity percent | | |
|---|---|---|---|
| | 60 | 40 | 20 |
| Sodium salt of styrene-maleic acid | $9.0 \times 10^7$ | $3.9 \times 10^8$ | $4.0 \times 10^{10}$ |

The following examples will serve to illustrate the invention.

EXAMPLE 1

Biaxially orientated polyethylene terephthalate film was coated with the following solution:

Styrene-itaconic copolymer containing 40 mole percent of itaconic acid—0.3 g.
Potassium hydroxide—0.12 g.
Methanol—70 ml.
Acetone—20 ml.
Water—10 ml.
Dried at 90° C. for 2 minutes'

The surface resistivity at 60% RH was $1.5 \times 10^8$ ohms/sq. and an adherent layer of photographic emulsion was applied to the reverse side of the film without affecting the antistatic properties.

EXAMPLE 2

A film of cellulose triacetate having a thin adherent layer of gelatin containing 20% w./w. cellulose acetate on both sides was coated with the following solutions:

Styrene maleic acid copolymer containing 50 mole percent maleic acid—0.8 gms.
Sodium hydroxide—0.20 gms.
Methanol—90.0 ml.
Water—10.0 ml.

and dried for 10 minutes at 90° C. Approximately 0.9 mgm. of copolymer was applied per sq. dm. and the surface resistivity at 60% RN was $1.1 \times 10^{10}$ ohms/sq. A photographic gelatino-silver halide emulsion was applied to both sides and no defects due to static electricity were observed. The photographic properties of the emulsion were not affected by the antistatic coatings.

The same solution was applied to polycarbonate film having an adherent layer of gelatin on both sides. Similar surface resistivity results were obtained.

EXAMPLE 3

The solution as in Example 2, but with the addition of 0.01% v./v. of Cationic SP (Monsanto Chemical Company Limited) was applied to cellulose acetate film so that there was 0.5 mgm. of copolymer per dm.$^2$ and the surface resistivity at 40% RH was $4 \times 10^9$ ohms/sq.

EXAMPLE 4

Biaxially orientated polyethylene terephthalate film with an adherent layer of silica filled polyvinyl formal suitable for drafting use was further coated with the following solution:

Methyl methacrylate-maleic acid copolymer containing 50 mole percent maleic acid—0.8 gms.
Sodium hydroxide—0.25 gms.
Methanol—80.0 mls.
Water—20.0 mls.

and dried for 5 minutes at 100° C. The surface resistivity at 60% RH was $1 \times 10^{10}$ ohms/sq. and there was no tendency for sheets of drafting film to stick together because of static pick up. The ink-take and adhesion to the drafting film surface was improved by the antistatic coat.

The same solution applied to polyester film gave a surface resistivity measurement of $2 \times 10^8$ ohms/sq. at 60% RH.

EXAMPLE 5

A film of cellulose acetate was coated with the following solution:

Ethylene-maleic acid copolymer containing 30 mole percent maleic acid—07. gm.
Sodium hydroxide—0.2 gms.
Ethanol—85.0 ml.
Methyl ethyl ketone—10.0 ml.
Water—5.0 ml.

and dried for 5 minutes at 90° C. The surface resistivity was $5 \times 10^9$ ohms/sq. at 60% RH. The film was coated on the reverse side with an adherent layer of photographic gelatine silver halide emulsion and no defects due to static electricity were observed.

EXAMPLE 6

Biaxially orientated polyethylene terephthalate film with an adherent gelatin layer was coated with the following solution:

Methyl vinyl ether-maleic acid copolymer containing 50 mole percent maleic acid—0.5 gms.
Lithium nitrate—0.2 gms.
Methanol—90.0 mls.
Water—10.0 mls.
Sodium hydroxide—0.20 gms.

and dried for 5 minutes at 100° C. The surface resistivity at 60% RH was $2 \times 10^9$ ohms/sq. and when a further coating of a photographic gelatino silver halide was applied no defects due to static were observed.

We claim as our invention:

1. An antistatic film base comprising a hydrophobic film base having a coating consisting essentially of a sodium, potassium or lithium salt of a copolymer of an alpha-beta unsaturated dicarboxylic acid or anhydride with an ethylenically unsaturated comonomer, the said coating comprising from 0.05 to 3 mgm. per square decimeter of the copolymer on the film base.

2. An antistatic film base according to claim 1 wherein the dicarboxylic acid or anhydride is selected from maleic, itaconic, citraconic and dimethyl maleic.

3. An antistatic film base according to claim 1 wherein the ethylenically unsaturated comonomer is a compound of the general formula:

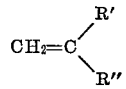

where R' and R" are both hydrogen, or where R' is an aryl group or an alkaryl group and R" is hydrogen, or where R' is alkoxyl (—OR) in which the hydrocarbon portion R contains not more than six carbon atoms and R" is hydrogen, or where R' is carbo-alkoxyl (COOR) in which hydrocarbon portion R contains not more than six carbon atoms and R" is hydrogen or methyl, or where R' is carbamide (—CONH$_2$) and R" is hydrogen or methyl, or where R' is acyloxy (—OCOR) in which the hydrocarbon portion R contains not more than six carbon atoms, and R" is hydrogen or methyl.

4. An antistatic film base according to claim 3 wherein the said comonomer is ethylene, styrene, vinyl toluene, methylvinyl ether, methyl methacrylate, ethyl acrylate, acrylonitrile, acrylamide, or vinyl chloride.

5. An antistatic film base according to claim 1 wherein the copolymer contains 50 to 20 mole percent of dicarboxylic component and 20 to 100% of the total carboxylic functions in the copolymer are present as sodium potassium or lithium salt functions.

6. An antistatic film base according to claim 1 wherein the copolymer is prepared from maleic acid or anhydride and styrene, the product containing 40 to 50 mole percent of the dicarboxylic component and 40 to 50% of the total carboxylic functions being present as sodium, potassium or lithium salt functions.

References Cited

UNITED STATES PATENTS

| | | | |
|---|---|---|---|
| 2,047,398 | 7/1936 | Voss et al. | 260—75 |
| 2,469,407 | 5/1949 | Powers et al. | 117—145X |
| 2,576,915 | 12/1951 | Barrett | 117—139.5 |
| 2,808,349 | 10/1957 | Melamed | 117—139.5 |
| 2,819,189 | 1/1958 | Suen et al. | 117—145X |
| 2,854,357 | 9/1958 | Johnson et al. | 117—139.5X |
| 2,892,736 | 6/1959 | Johnson et al. | 117—139X |
| 2,279,410 | 4/1942 | Nadeau et al. | 96—87X |
| 2,698,794 | 1/1955 | Godowsky | 96—98 |
| 2,739,062 | 3/1956 | Griggs et al. | 117—34X |

WILLIAM D. MARTIN, Primary Examiner
T. G. DAVIS, Assistant Examiner

U.S. Cl. X.R.
117—145; 96—75